(Model.)
J. SCHOELLKOPF.
SAND BAND.
No. 268,945. Patented Dec. 12, 1882.
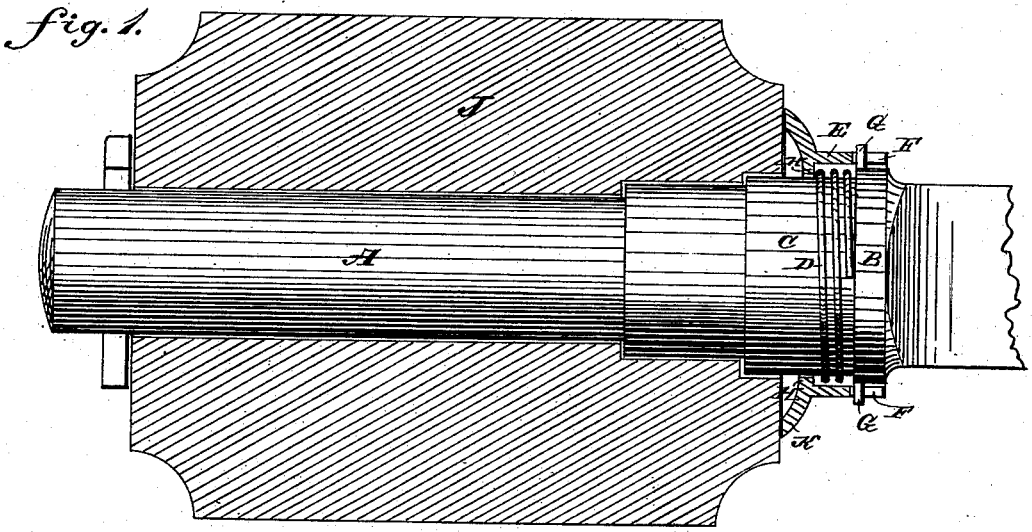
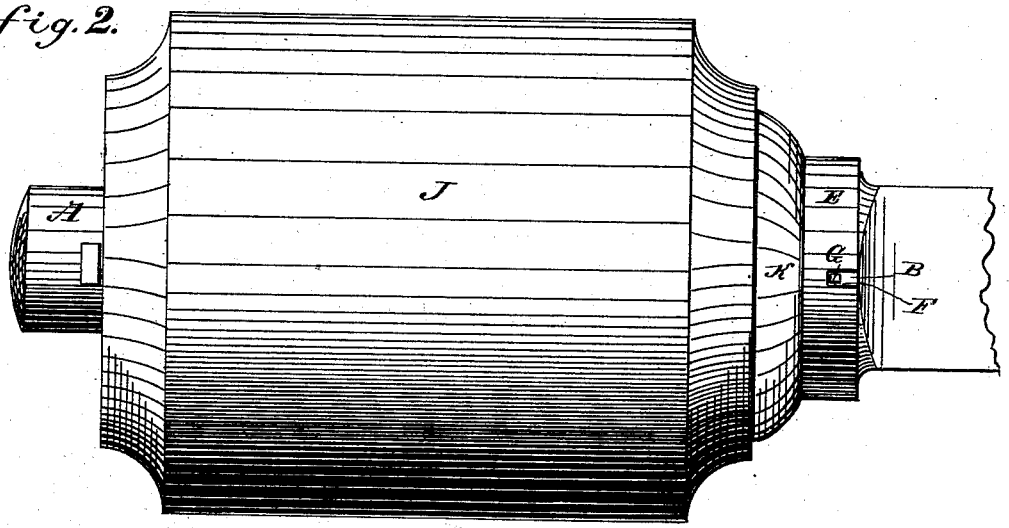
WITNESSES:
INVENTOR:
J. Schoellkopf
BY
ATTORNEYS.

UNITED STATES PATENT OFFICE.

JOHN SCHOELLKOPF, OF TIDIOUTE, PENNSYLVANIA.

SAND-BAND.

SPECIFICATION forming part of Letters Patent No. 268,945, dated December 12, 1882.

Application filed May 23, 1882. (Model.)

*To all whom it may concern:*

Be it known that I, JOHN SCHOELLKOPF, of Tidioute, Warren county, Pennsylvania, have invented a new and Improved Dust-Cap for Hubs, of which the following is a full, clear, and exact description.

The object of my invention is to prevent sand, dust, and water from passing into the space between the axle and the axle-box in a hub.

The invention consists in a cup-shaped ring, mounted loosely on the axle between the inner end of the hub and a collar on the axle, which ring is provided with an external shoulder, between which and the collar a spiral spring surrounds the axle, which spring presses the ring against the hub. The ring is provided with an annular flange having notches through which studs pass which project from the collar on the axle and prevent the ring from rotating with the hub.

Reference is to be had to the accompanying drawings, forming a part of this specification, in which similar letters of reference indicate corresponding parts in both figures.

Figure 1 is a longitudinal sectional elevation of a hub provided with my improved dust-cap, and Fig. 2 is a longitudinal elevation of the same.

The axle A is provided with a collar, B, in the usual manner, and the shoulder C, directly in front of this collar, is made longer than in an ordinary axle. A spiral spring, D, surrounds the shoulder C and rests against the collar B. A cup-shaped ring, K, is provided at its smaller edge with an annular flange, E, fitting over the collar, and this flange is provided with one or more transverse notches, F, or recesses, through which studs G, projecting from the collar B, project, for the purpose of preventing the collar E and the cap or ring K from turning with the wheel. The cap or ring K is provided at its inner edge or smaller opening with an annular shoulder, H, against which the spring D rests, the spring being thus contained between the shoulder H and the collar B, and pressing the outer edge of the cap K against the inner end of the hub J, mounted on the axle A. The cap adjusts itself automatically, and rests so closely against the end of the hub that it prevents dust, sand, or water from passing in between the axle and the hub, whereby the friction of the wheel will be materially reduced. The dust-cap is independent both of the hub and axle, and is not attached to either.

The dust-cap can be made of metal or of rubber with a metal facing, and in the latter case the spring D might be dispensed with; but I prefer the construction shown.

Having thus described my invention, I claim as new and desire to secure by Letters Patent—

1. The combination, with the axle A and the hub J, of the cup-shaped ring K, and the spring D within it, substantially as herein shown and described, and for the purpose set forth.

2. The combination, with the hub J, and the axle A, provided with a collar, B, of the cup-shaped ring K, provided with an annular flange, E, having notches F, the studs G, and the spring D, substantially as herein shown and described, and for the purpose set forth.

3. The combination, with the hub J, and the axle A, provided with a collar, B, of the cup-shaped ring K, provided with an annular internal shoulder, H, and with an annular flange, E, having notches F, the studs G, and the spring D, substantially as herein shown and described, and for the purpose set forth.

JOHN SCHOELLKOPF.

Witnesses:
 D. S. THOMPSON,
 E. A. BALDWIN.